United States Patent

Gachot et al.

[15] 3,672,260
[45] June 27, 1972

[54] COMPRESSED-AIR ACTUATOR

[72] Inventors: Jean Gachot, 179 Avenue de la Division Leclerc, 95 Enghien; Fernand Perales, 87 Avenue A. G. Belin, 95 Argenteuil, both of France

[22] Filed: Dec. 14, 1970

[21] Appl. No.: 97,928

[52] U.S. Cl. ........................... 92/69, 74/102, 91/174, 92/138
[51] Int. Cl. ................................................ F01b 7/02
[58] Field of Search .............. 92/69 R, 75, 138; 91/174; 74/102, 103, 104

[56] References Cited

UNITED STATES PATENTS

| | | | |
|---|---|---|---|
| 3,411,409 | 11/1968 | Bunyard | 92/136 X |
| 3,253,518 | 5/1966 | Duemler | 92/138 X |
| 3,539,748 | 11/1970 | Neumeier | 74/102 |
| 2,876,751 | 3/1959 | Kolthoff | 92/69 X |
| 3,040,717 | 6/1962 | Rumsey | 92/136 |
| 3,148,595 | 9/1964 | Looney | 92/136 X |
| 3,151,533 | 10/1964 | Hartel | 92/136 X |
| 3,537,358 | 11/1970 | Bunyard | 92/136 |
| 3,585,902 | 6/1967 | Anderson | 92/138 X |

*Primary Examiner*—Martin P. Schwadron
*Attorney*—Young & Thompson

[57] ABSTRACT

A compressed air actuator is provided which is capable of producing a limited angular displacement of an output shaft. The actuator comprises an air tight cylinder wherein two pistons are adapted to slide in opposite directions relative to each other. Each piston is integral with a slide-block which carries a roller engaging a fork of a pivotal lever mechanically coupled to the output shaft. The slide-blocks are guided by sleeves rotatably mounted on the output shaft and by an end guide flange with antifriction packings resting on the inner wall of the cylinder. Each slide-block carries an end guide lug capable of being received in a cavity of the opposite piston when the two pistons come close to each other.

10 Claims, 11 Drawing Figures

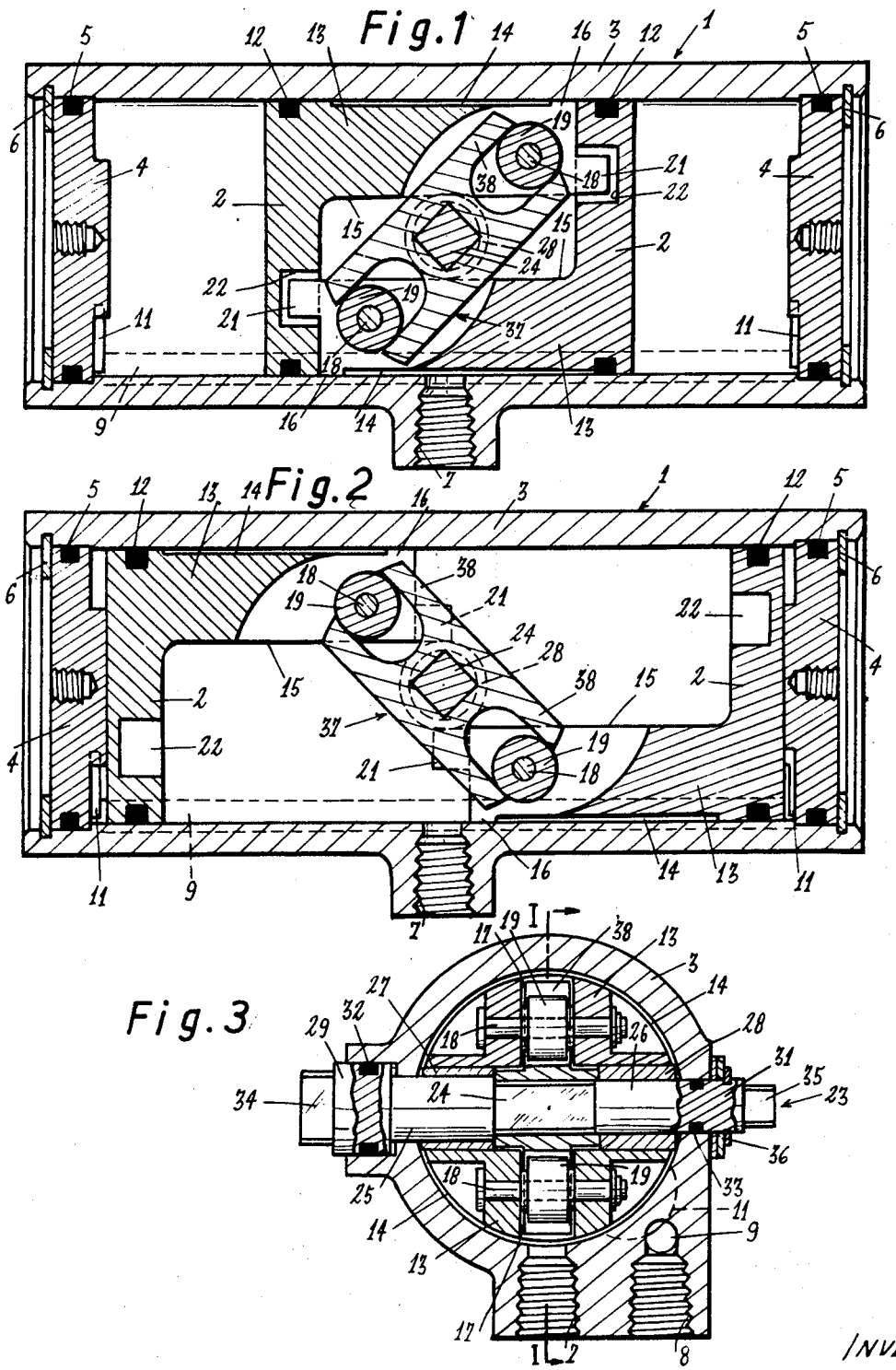

INVENTORS
JEAN GACHOT
FERNAND PERALES
By Young + Thompson
ATTYS

COMPRESSED-AIR ACTUATOR

This invention relates to a compressed-air actuator for carrying out a limited angular displacement of an output shaft.

Said output shaft can be coupled to any device comprising a moving element which is intended to be driven either continuously or non-continuously in limited angular reciprocating motion such as a ball-valve or windshield wiper.

Compressed-air actuators of known types comprise a leak-tight cylinder in which two pistons are capable of sliding motion in opposite directions. Each piston carries a toothed rack which is parallel to the generator-lines of the cylinder and disposed in meshing engagement with a toothed wheel or pinion which is rotationally coupled to the output shaft.

Said pinion must be located within the space formed between the two toothed racks which are disposed along two opposite generator-lines of the cylinder. In consequence, the diameter of said pinion must necessarily be distinctly smaller than the internal diameter of the cylinder and this limits the useful torque which is transmitted to the output shaft in respect of a given air pressure and diameter of cylinder.

Moreover, it is known that friction losses within a rack and pinion system are of a high order and this sets a further limitation on the useful torque at the output.

In point of fact, the value of the useful torque obtained in respect of a given compressed-air pressure is critical in some fields of application. It is known that, in practice, the air pressure in compressed-air systems is standardized at 7 bars in the case of control circuits and at 3 bars in the case of regulating circuits. By reason of their low efficiency (as measured by the ratio of useful torque to air pressure), actuators which are known at the present time cannot be employed in regulating circuits.

Finally, the teeth of the racks have a certain fragility which limits the operational safety and service life of the apparatus.

The primary aim of this invention is to overcome these disadvantages by making it possible to increase the leverage of the force which is transmitted by the pistons, to reduce friction losses to a considerable extent and to provide a rugged apparatus having a long service life.

In accordance with the invention, the compressed-air actuator for carrying out a limited angular displacement of an output shaft and comprising a leak-tight cylinder in which are mounted two pistons adapted to slide in leak-tight manner within said cylinder in opposite directions relative to each other and a system for transmission of motion of the piston to the output shaft is characterized in that said transmission system comprises a pivotal lever which is coupled rotationally to the output shaft and has two terminal forks, there being engaged in each fork a roller which is coupled translationally to one of said pistons.

In accordance with an advantageous arrangement of the invention, each piston carries a slide-block provided at its extremity with a recess in which the corresponding roller is mounted. The roller is capable of rotating freely about a shaft which passes through said recess.

Thus, the only friction forces which arise in the transmission system are rolling-friction forces which can be maintained at a very low value.

In a preferred embodiment of the invention, the slide-blocks are limited by a cylindrical surface having a diameter which is slightly smaller than that of the cylinder and by a flat surface which is parallel to the generator-lines of the cylinder and bears on sleeves which rotate freely about the output shaft.

Thus, the friction forces which arise from the motion of the pistons are also reduced to a very small value.

In an advantageous embodiment of the invention, the pivotal lever has a maximum length which is substantially equal to the internal diameter of the cylinder, thereby making it possible to obtain the maximum value of leverage which is compatible with the external dimensions of the cylinder.

In a preferred embodiment of the invention, the pivotal lever is constituted by a circular disc having two diametrically opposite notches and the rollers which are coupled translationally to the pistons are adapted to engage respectively in said notches.

The circular cross-sectional shape of the lever results in an appreciable increase in the shearing strength of the forks in which the rollers are engaged. Said forks are not liable to open even after a large number of operations.

In a preferred embodiment of the invention, each slide-block is provided at that extremity which is remote from the piston with a cylindrical guide flange having a diameter which is substantially equal to that of the cylinder. Said cylindrical flanges are preferably fitted with antifriction packings. Furthermore, each slide-block is provided at the end remote from the piston with at least one guide lug and each piston has a cavity which is so arranged as to receive the guide lug of the slide-block of the other piston.

Thus, the moving system which is constituted by a piston and its slide-block comes into rubbing contact with the internal wall of the cylinder only at both ends on the one hand at the level of the piston and on the other hand at the level of the guide flange. The slide-block is continuously maintained parallel to the axis of the cylinder since one of its faces is applied against the rotary sleeves which are carried by the output shaft. When the two pistons are located in proximity to each other, the guide lugs of the slide-blocks engage in the corresponding cavities of the pistons, thus forming an additional bearing point. In this manner, perfect guiding is obtained over the entire range of travel of the slide-blocks while minimizing sliding friction on the internal face of the cylinder.

In a preferred embodiment of the invention, each piston carries an annular seal and a resilient centering member which is placed on the side opposite to the pivotal lever with respect to said seal.

Said centering member serves to ensure even more effective guiding and prevents any risk of jamming, especially in actuators which have a high output torque and operate at high air pressures.

In an advantageous embodiment of the invention, the actuator is fitted with two restoring springs mounted in casings which are secured respectively to each end of the cylinder, each spring being compressed during travel in one direction of the pistons and adapted to actuate said pistons during their travel in the opposite direction.

It is thus possible to simplify the construction, installation and use of the actuator since the compressed air is necessary only in order to initiate operation in one direction while the restoring springs automatically ensure operation in the other direction as soon as the action of the compressed air is discontinued.

Further properties and advantages of the invention will become apparent from the detailed description which now follows below, a number of embodiments of the invention being shown in the accompanying drawings which are given by way of non-limiting example, and in which:

FIG. 1 is an axial sectional view taken along line I—I of FIG. 3 and showing a first embodiment of the actuator in accordance with the invention, the two pistons being shown at one end of travel;

FIG. 2 is a view corresponding to FIG. 1 in which the two pistons are shown at the other end of travel;

FIG. 3 is a transverse sectional view taken along line III—III of FIG. 4;

Figure 4:
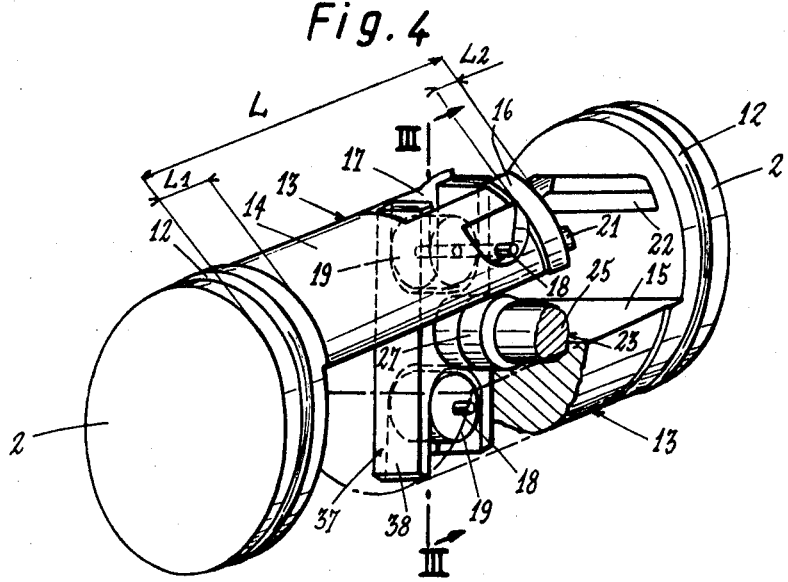
FIG. 4 is a cutaway view in perspective showing the moving system of the actuator of FIGS. 1 to 3.

The compressed-air actuator which is illustrated in FIGS. 1 to 4 comprises a leak-tight cylinder 1 in which are mounted two similar pistons 2.

The cylinder 1 has a cylindrical body 3 which is closed at both ends by two cylinder heads 4, each head being fitted with an O-ring seal 5 and held in position by means of a resilient split-ring 6. A first diametral port 7 is provided in the central portion of the body 3 for the admission of compressed air and opens directly into the interior of the cylinder; provision is made in the body 3 for a second lateral air-admission port 8 which opens into a longitudinal duct 9 pierced in an enlarged portion of the wall of said body. Each end of the duct 9 terminates in a milled slot 11 which is formed in each end of the body 3.

Each of the two pistons 2 is fitted with an O-ring seal 12 and carries a slide-block 13, the two slide-blocks being directed towards each other and disposed at an angle of 180 degrees with respect to each other. Each slide-block 13 is limited by a portion of cylindrical surface 14 which is coaxial with the body 3 and by a flat surface 15 which is parallel to the generator-lines of the cylinder. The diameter of the cylindrical surfaces 14 is slightly smaller than the internal diameter of the body 3. At the end remote from the piston 2, each slide-block has a cylindrical guide flange 16, the diameter of which is substantially equal to the internal diameter of the body 3.

A recess 17 is cut in the extremity of each slide-block 13 and is traversed by a shaft 18, a roller 19 which is housed within said recess being capable of rotating freely about said shaft.

Two guide lugs 21 are disposed symmetrically with respect to the recess 17 and on the front face of each slide-block, one face of each lug being flat and located in the line of extension of the flat face 15 of the slide-block. Each piston 2 has a cavity 22 in which the guide lugs 21 engage when the pistons are in the position of minimum relative spacing (as shown in FIG. 1).

An output shaft 23 (shown in FIGS. 3 and 4) is located in a diametral plane of the cylindrical body 3 in parallel relation to the flat faces 15 of the two slide-blocks 13. Said shaft 23 has a polygonal central portion 24 — which has a square transverse cross-sectional shape in the embodiment shown — and on each side of which are provided two cylindrical bearings 25, 26 having diameters which are different from each other. Sleeves 27, 28 are fitted over said bearings in such a manner as to rotate freely with respect to these latter. The external diameters of said sleeves are both equal to the distance between the flat faces 15 of the two slide-blocks 13 so that these latter are applied against said sleeves during their displacement.

The bearings 25 and 26 of the shaft 23 have extensions in the form of journals 29, 31 which are also of different diameter with respect to each other, the journal 29 of larger diameter being adjacent to the bearing 25 of larger diameter. Said journals are fitted with seals 32, 33 and are carried by bearings of the cylindrical body 3. The ends of the shaft 23 consist of squares 34 and 35. The shaft 23 is held in position by means of a split-ring 36.

The connection between the rollers 19 and the output shaft 23 is provided by means of a pivotal lever 37 which is pierced by a central opening having a polygonal cross-section which is adapted to the cross-sectional shape of the central portion of the shaft 23. The diameters of the smaller bearing 26 and of the smaller journal 31 of said shaft are such that these latter are permitted to pass through the central opening of the lever 37 and through the two bearings of the body 3 so that the shaft 23 can be removed simply by detaching the split-ring 36.

The lever 37 is centered on the shaft 23 by means of the two sleeves 27 and 28.

Each end of the lever 37 constitutes a fork 38 in which is engaged a roller 19. The maximum length of the lever 37 is substantially equal to the internal diameter of the body 3 in order to ensure maximum leverage for the forces which are transmitted by the pistons 2.

The operation of the actuator is as follows.

Assuming that the pistons 2 are located in the position of minimum relative spacing (as shown in FIG. 1), compressed air is admitted into the cylinder 1 through the diametral port 7. The air thus flows into the space located between the two pistons and moves these latter away from each other.

The rollers 19 are driven in translational motion by means of their shafts 18 and produce the pivotal motion of the lever 37 while rolling on the internal walls of the forks 38. The lever 37 which is rotationally coupled to the shaft 23 by reason of the polygonal cross-section of the central portion 24 causes said shaft to rotate through an angle which is determined by the length of travel of the pistons and by the length of the lever 37. In the example which is illustrated, said angle is of the order of 90°.

In order to cause the shaft 23 to rotate in the opposite direction, compressed air is admitted through the lateral port 8. The air passes through the duct 9 and the recesses 11 of the cylinder heads and flows out between said heads and the outer faces of the pistons 2. Said pistons move towards each other and cause the shaft 23 to rotate in the other direction by means of the rollers 19 and lever 37.

The two moving systems which are constituted by a piston 2, a slide-block 13 and a roller 19 are each subjected on the one hand to the forces applied to the piston 2 by the compressed air and on the other hand to the reaction of the pivotal lever 37 on the roller 19. The resultant of the forces applied by the compressed air is substantially parallel to the axis of the cylinder 1 while the reaction of the lever 37 is directed at an oblique angle with respect to the axis of said cylinder except in the particular position of the lever 37 in which this latter is in turn at right angles to the axis of the cylinder 1. Each moving system is thus subjected to a pivotal-motion torque which tends to give rise to substantial friction on the internal wall of the cylinder 1 and is even liable to result in jamming of the moving system.

It is apparent that, under these conditions, the guide means which are provided for the moving systems play an essential part.

In the actuator in accordance with the invention as hereinabove described, each of the two moving systems is applied against the internal wall of the cylinder 1 only at both ends, that is to say at one end by means of the peripheral surface of the piston 2 and at the other end by means of the surface of the cylindrical flange 16.

The peripheral surface of the piston 2 is applied against the entire periphery of the cylinder 1 and consequently serves to center one end of the moving system. On the other hand, the other end of the moving system is applied by means of the flange 16 against only a portion of the periphery of the cylinder 1. In order to prevent any jamming, it is therefore very important to ensure that guide means are provided for the flat face 15 of each slide-block 13 in order to ensure centering and application of the flange 16 on the internal surface of the cylinder 1.

To this end, guide means are accordingly provided by the invention. In the first place, the flat faces 15 of the slide-blocks 13 are applied during the greater part of their travel against the rotary sleeves 27 and 28 which are passed over the output shaft 23 (as shown in FIGS. 3 and 4). In the second place, the front guide lugs 21 provide an additional support at each end of travel either by engaging in the cavity 22 of the opposite piston (as shown in FIG. 1) or by bearing on the sleeves 27 and 28 (as shown in FIG. 2).

Under these conditions, the flange 16 is continuously applied against the internal wall of the cylinder 1. For example, if the initial position is that in which the two pistons 2 are spaced at the minimum distance from each other (as shown in FIG. 1) and subsequently move to the position of maximum relative spacing (as shown in FIG. 2), it is apparent that the application of the flange 16 against the cylinder wall is ensured first by the lug 21 which is engaged within the cavity 22 and then by the face 15 of the slide-block which is in contact with the sleeves 27 and 28 and finally by the lug 21 which is applied against said sleeves. Any danger of jamming or prohibitive friction is thus removed since the two moving systems are continuously centered at both ends in a positive manner.

The friction which is encountered is only rolling friction and therefore of very low value (between the rollers 19 and the lever 37 and between the sleeves 27, 28 and the slide-block 13) with the exception of the sliding friction between on the one hand the piston and slide-blocks and on the other hand the cylinder wall.

In this invention, the friction last mentioned is reduced to a very substantial extent by reason of the fact that the two systems which consist of the pistons and slide-blocks bear on the cylinder wall only at their two ends, thereby considerably reducing the sliding friction surfaces.

More specifically, the invention is intended to ensure that the sum of axial lengths L1 + L2 of the two surfaces of each moving system which are applied against the cylinder wall is equal at a maximum to one-quarter of the total axial length L of each moving system (as shown in FIG. 4).

It should be noted that this reduction in area of the surfaces which are applied against the cylinder wall does not impair the quality of centering but results on the contrary in an improvement in this respect. In fact, if it is assumed that the cylindrical surfaces 14 have the same diameter as the pistons 2 and the cylindrical flanges 16 so that the moving system can theoretically be applied against the cylinder wall over its entire length, it could be expected a priori that more accurate centering of said moving system would consequently be achieved. In actual fact, it would not be possible to define beforehand the regions of the peripheral surface which actually come into contact with the cylinder since the real surfaces are not ideal geometrical surfaces and it is therefore not possible to establish contact between all points of two adjacent surfaces. This being the case, the real contacting surfaces would be indeterminate and would vary in practice from one actuator to the other. If said real contacting surfaces were located near the center of the moving system, this would clearly result in defective centering and jamming would be practically inevitable. It is therefore apparent that the structure in accordance with the invention ensures good centering at both ends of the moving system while reducing sliding friction to an appreciable extent.

The arrangement of the rollers 19 within the recesses which are cut in the slide-blocks in conjunction with the length of the pivotal lever 37 ensures maximum leverage of the forces which are transmitted by the pistons and consequently a maximum value of the useful output torque.

All the components of the mechanism are rugged and the actuator has a very long service life by reason of the very low values of friction.

Two further embodiments of the invention which comprise restoring springs will now be described with reference to FIGS. 5 and 6. In these figures, the same elements as those shown in FIGS. 1 to 4 are given the same reference numerals.

Figure 5:
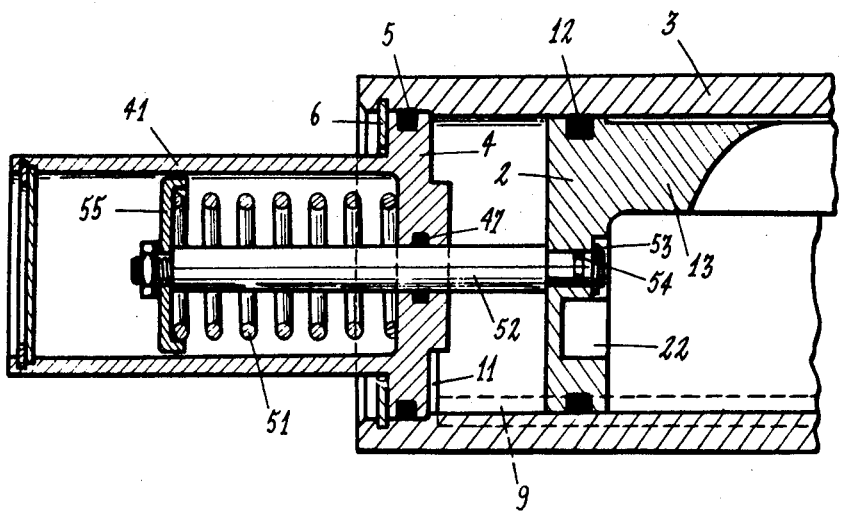
FIGS. 5 and 6 are fragmentary axial sectional views of embodiments of the invention which comprise restoring springs.

In the embodiment which is illustrated in FIG. 5, the pistons 2 are moved towards each other under the action of compressed air and away from each other by means of restoring springs.

Each cylinder head 4 is adapted to carry an external casing 41 which contains a spring 51. A cylindrical push-rod 52 passes through said cylinder head 4 and one extremity of said rod is attached to the piston 2 by means of a split-ring 53. Said rod extremity is fitted with a seal 54. The other rod extremity is located within the casing 41 and carries a cup 55. The spring 51 is located between said cup 55 and the cylinder head 4.

When compressed air is admitted through the lateral port 8 (not shown in FIG. 5), the air passes into the cylinder 1 through the milled slots 11 of the body 3 and brings the two pistons towards each other. The push-rods 52 which are actuated by the pistons compress the springs 51. When the action of the compressed air is discontinued, said springs expand and move the two pistons away from each other.

Figure 6:
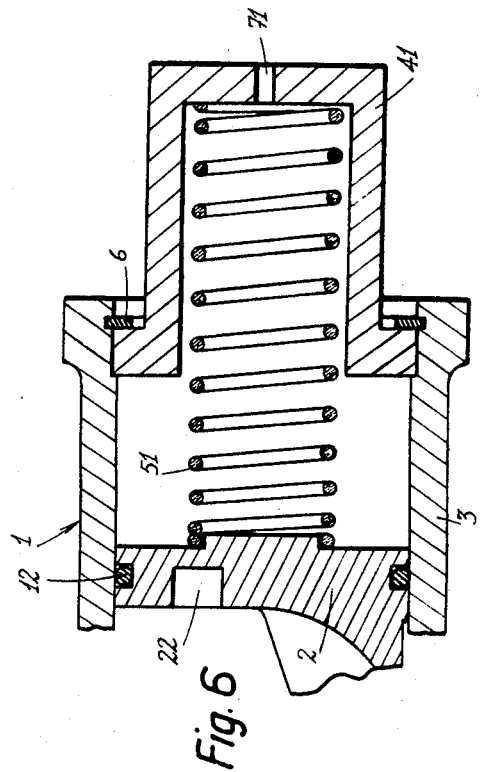

In contrast to the embodiment which is illustrated in FIG. 5, the pistons are moved away from each other in the embodiment shown in FIGS. 6 under the action of the compressed air which is admitted into the space formed between said two pistons and are then returned automatically towards each other by means of restoring springs as soon as the action of the compressed air stops.

The cylinder 1 is provided at each end with a head in the form of a casing 41 which is held in position by means of a resilient split-ring 6. There is placed within said casing 41 a spring 51 which is applied on the one hand against the end wall of said casing and on the other hand against the end face of the corresponding piston 2.

An aperture 71 formed in the end wall of the casing 51 serves to establish a communication between the interior of said casing and the surrounding atmosphere. When compressed air is admitted through the diametral port 7 (not shown in FIG. 6), the pistons 2 move away from each other and compress the springs 51. The aperture 71 maintains the interior of the casing 41 at atmospheric pressure. When the action of the compressed air is discontinued, the springs 51 expand and automatically return the two pistons 2 towards each other.

Figure 7:
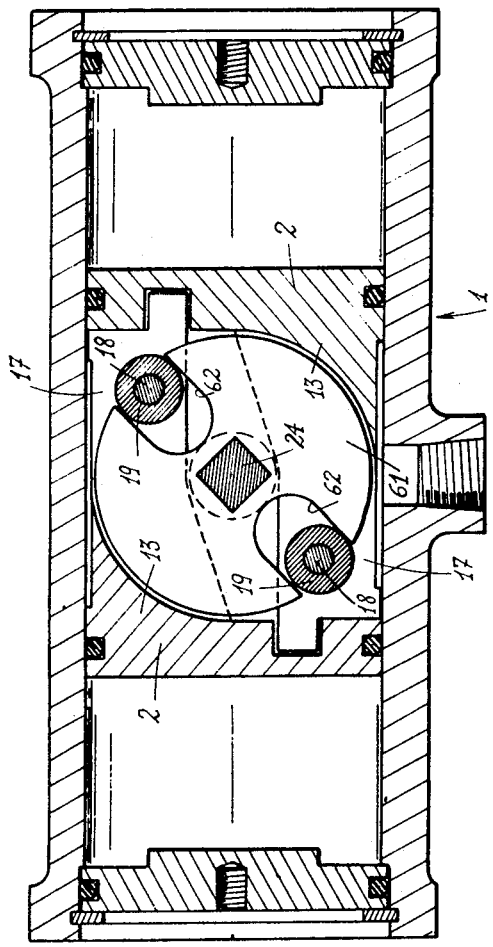
FIG. 7 is an axial sectional view of an actuator provided with a pivotal lever consisting of a notched disc, the two pistons being shown in their position of minimum relative spacing.

An alternative embodiment of the actuator of FIGS. 1 to 4 will now be described with reference to FIGS. 7 and 8.

In this alternative form of construction, the actuator additionally comprises a leak-tight cylinder 1 having a substantially rectangular cross-section within which two pistons 2 are capable of sliding and each carry a slide-block 13.

Each slide-block 13 supports the shaft of a roller 19 which is housed within a longitudinal recess 17 of the slide-block.

An output shaft 23 which is supported by the cylinder 1 has a central portion 24 of polygonal cross-sectional shape on which is mounted a pivotal lever 61.

Said lever 61 is constituted by a circular disc, there being formed in said disc two diametrically opposite notches 62 in which the two rollers 19 are intended to engage. The diameter of the disc 61 is close to the internal diameter of the cylinder 1.

The lever 61 is thus endowed with very high shearing strength and the notches 62 are not liable to open even after a very large number of operations.

Said lever can be machined very economically and has a diameter such that the rollers are endowed with the maximum leverage which is compatible with the diameter of the cylinder 1.

Figure 8:
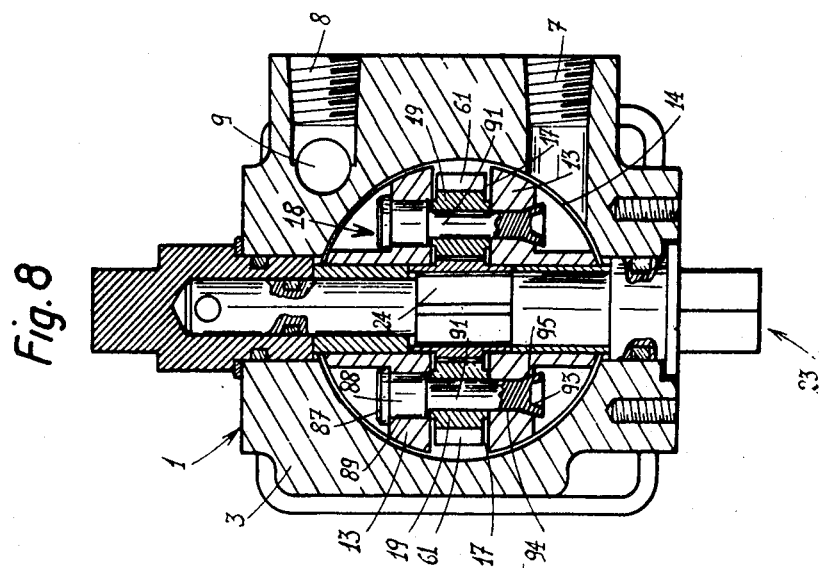
FIG. 8 is a transverse sectional view of the actuator of FIG. 7, the two pistons being in an intermediate position.

The shaft 18 of the roller 19 is provided (as shown in FIG. 8) firstly with a head 87 which is applied against the slide-block 13, then has a cylindrical portion 88 located within a bore 89 of said slide-block 13, then a portion 91 having a smaller diameter and on which the roller 19 is rotatably mounted and finally the extremity 93 which has a hollowed-out central portion. The cylindrical portion 91 extends through a bore 94 of the slide-block 13 and said bore has a conical flared portion 95 at the end remote from the roller 19. The hollowed-out extremity 93 of the shaft 18 is expanded within said flared portion 95.

Figure 9:
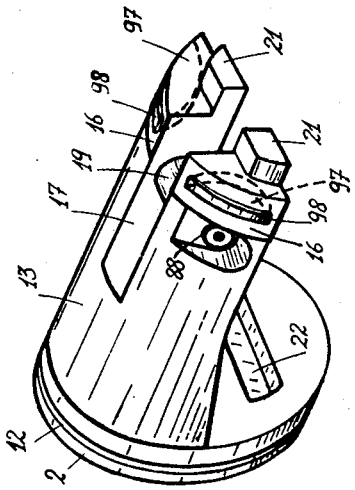
FIG. 9 is a view in perspective showing a piston and a slide-block fitted with seals.

In a preferred embodiment, the slide-block 13 (shown in FIG. 9) is provided on each arm of the cylindrical flange 16 on each side of the recess 17 with a groove 97 of substantially semi-circular cross-section. There is fixed in each groove 97 an antifriction packing 98 of plastic material such as polytetrafluoroethylene.

Accordingly, sliding friction is minimized by means of said packings. Moreover, wear of the body 3 of the cylinder 1 and of the cylindrical flanges 16 is reduced to a minimum.

In another embodiment (shown in FIGS. 10 and 11), each moving system which is constituted by a piston and a slide-block comprises a centering member of resilient plastic material which is placed on that side of the free extremity of the piston which is remote from the slide-block and from the pivotal lever with respect to the seal 12 of the piston 2.

Figure 10:
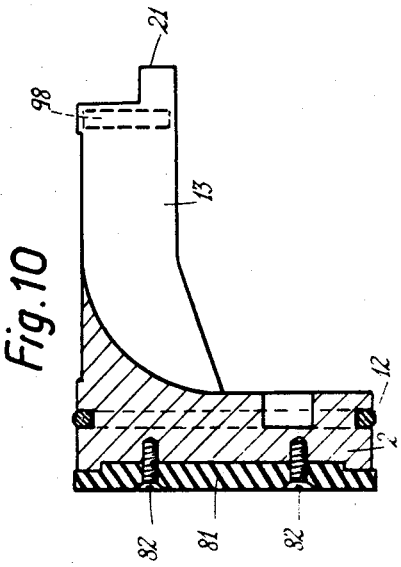
FIG. 10 is an axial sectional view of a slide-block and a piston fitted with a centering end-plate.

In the form of construction shown in FIG. 10, said centering member is constituted by a circular plate 81 of polytetrafluoroethylene which is fixed on the end face of the piston 2 by means of screws 82. The diameter of said plate 81 is slightly larger than that of the piston.

Figure 11:
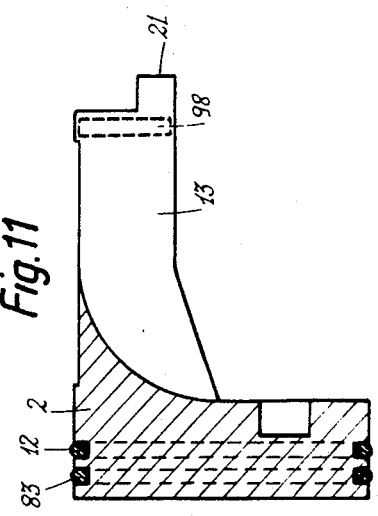
FIG. 11 is a view which is similar to FIG. 10 and in which the centering member is a resilient ring.

In the embodiment of FIG. 11, the centering member is constituted by a ring 83 of plastic material which is placed within a peripheral channel of the piston.

Said centering members ensure excellent guiding of the piston and of the slide-block, prevent any jamming and protect the seal 12, particularly in actuators of large diameter which produce a substantial effort.

It is readily apparent that the invention is not limited to the embodiments which have just been described and that many alternative forms of execution can accordingly be contemplated without thereby departing either from the scope or the spirit of this invention.

What we claim is:

1. A compressed-air actuator for effecting a limited angular displacement of an output shaft, said actuator comprising:
   a leak-tight cylinder,
   two pistons slidable in a leak-tight manner within said cylinder in opposite directions relative to each other,
   a pivotal lever rotationally coupled to said output shaft and having two oppositely extending forks,
   a slide-block carried by each said piston,
   a roller carried by each slide-block and engaging one of said forks,
   each said slide-block having thereon a cylindrical surface having a diameter slightly smaller than that of said cylinder, and a planar surface substantially parallel to the generatrices of said cylinder and slidable over said output shaft, and at the end remote from the piston a cylindrical guide flange having a diameter substantially equal to that of the cylinder and at least one guide lug, one face of which is coplanar with said planar surface of the slide-block, each said piston having a cavity adapted to receive the guide lug of the slide block carried by the other piston.

2. A compressed-air actuator according to claim 1, wherein the pivotal lever is constituted by a circular disc whose diameter is close to the internal diameter of the cylinder, having two diametrically opposite notches comprising said forks.

3. An actuator according to claim 1, wherein the maximum length of the pivotal lever is substantially equal to the diameter of the cylinder.

4. An actuator according to claim 1, wherein the output shaft has a central portion of polygonal cross-section which engages within a bore of similar cross-section formed at the center of symmetry of the pivotal lever.

5. An actuator according to claim 1, wherein the output shaft is provided on each side of the pivotal lever with a cylindrical section for supporting a sleeve which is adapted to rotate freely with respect to said section and against which are applied the flat faces of the two slide-blocks and their guide lugs.

6. An actuator according to claim 5, wherein the cylindrical sections of the output shaft have different diameters relative to each other.

7. An actuator according to claim 1, wherein the cylindrical flanges for guiding the slide-blocks have a diameter which is slightly smaller than that of the cylinder and are fitted with antifriction packings.

8. An actuator according to claim 1, wherein each piston is fitted with an annular seal and a resilient centering member which is located on the side remote from the pivotal lever with respect to said seal.

9. An actuator according to claim 8, wherein the centering member is constituted by a ring of plastic material which is mounted within a peripheral groove of the piston.

10. An actuator according to claim 8, wherein the centering member is constituted by a plate of circular cross-section which is mounted on the extremity of the piston.

* * * * *

UNITED STATES PATENT OFFICE
CERTIFICATE OF CORRECTION

Patent No. 3,672,260                Dated June 27, 1972

Inventor(s) Jean Gachot et al

It is certified that error appears in the above-identified patent and that said Letters Patent are hereby corrected as shown below:

On the cover sheet insert:

-- [32]  Priority  Dec. 24, 1969 and July 9, 1970

[33]  France

[31]  44821 and 25544 --.

Signed and sealed this 19th day of December 1972.

(SEAL)
Attest:

EDWARD M. FLETCHER, JR.             ROBERT GOTTSCHALK
Attesting Officer                         Commissioner of Patents